US011370046B2

(12) United States Patent
Ly et al.

(10) Patent No.: US 11,370,046 B2
(45) Date of Patent: Jun. 28, 2022

(54) PROCESS AND DEVICE FOR PREVENTING BREAKAGE OF ELECTRODE WIRE DURING MACHINING BY SPARK EROSION

(71) Applicant: THERMOCOMPACT, Epagny Metz-Tessy (FR)

(72) Inventors: Michel Ly, Annecy (FR); Gérald Sanchez, Dingy-Saint-Clair (FR)

(73) Assignee: THERMOCOMPACT, Epagny Metz-Tessy (FR)

( * ) Notice: Subject to any disclaimer, the term of this patent is extended or adjusted under 35 U.S.C. 154(b) by 117 days.

(21) Appl. No.: 16/515,647

(22) Filed: Jul. 18, 2019

(65) Prior Publication Data

US 2020/0023451 A1 Jan. 23, 2020

(30) Foreign Application Priority Data

Jul. 23, 2018 (FR) ...................... 18 56819

(51) Int. Cl.
*B23H 7/10* (2006.01)
*B23H 7/04* (2006.01)
*B23H 7/02* (2006.01)

(52) U.S. Cl.
CPC .................. *B23H 7/10* (2013.01); *B23H 7/02* (2013.01); *B23H 7/04* (2013.01)

(58) Field of Classification Search
CPC . B23H 1/024; B23H 7/04; B23H 7/14; B23H 7/18; B23H 7/265; G05D 23/1917;

(Continued)

(56) References Cited

U.S. PATENT DOCUMENTS 4,341,939 A 7/1982 Briffod
4,459,454 A * 7/1984 Inoue ..................... B23H 7/101
219/69.12

(Continued)

FOREIGN PATENT DOCUMENTS

JP 61-288931 A 12/1986
JP 9-290325 A 11/1997

OTHER PUBLICATIONS

Gong et al, Modeling and experimental study on breakdown voltage (BV) in low speed wire electrical discharge machining (LS-WEDM) of Ti—6Al—4V, Int. J. Adv. Manuf. Technol., vol. 90, pp. 1277-1292 (2017).

*Primary Examiner* — Sang Y Paik
*Assistant Examiner* — Erwin J Wunderlich
(74) *Attorney, Agent, or Firm* — William H. Eilberg

(57) ABSTRACT

A device for machining a part by electrical discharge machining using an electrode wire. The device includes equipment for holding the electrode wire taut and driving the wire to translate longitudinally, in proximity to the part to be machined, in a sparking zone. The device further includes equipment for making a stream of dielectric liquid flow through the sparking zone between the electrode wire and the part to be machined. An electrical power source generates electrical pulses that cause sparks in the sparking zone between the electrode wire and the part to be machined. The quantity of gas bubbles present in the sparking zone is measured, and a signal is produced, representative of the quantity of bubbles, the signal being delivered to a controller. The controller modifies machining parameters so as to maintain the value of the signal within a suitable range.

14 Claims, 5 Drawing Sheets

(58) Field of Classification Search
CPC .... H05B 6/6405; H05B 6/6432; H05B 6/645; B23K 26/351; G05B 13/041; G05B 13/048; G05B 19/063; G05B 6/02; H01C 17/242; H02P 7/293
USPC ........................................................ 219/69.12
See application file for complete search history.

(56) References Cited

U.S. PATENT DOCUMENTS

| | | | |
|---|---|---|---|
| 4,536,632 A | 8/1985 | Inoue | |
| 5,122,630 A | 6/1992 | Reynier | |
| 5,833,835 A * | 11/1998 | Gimaev | B23H 3/02 |
| | | | 204/DIG. 9 |
| 5,945,010 A | 8/1999 | Tomalin | |
| 6,614,234 B1 * | 9/2003 | Imai | B23H 7/18 |
| | | | 324/452 |
| 6,707,304 B2 * | 3/2004 | Buhler | H01L 24/78 |
| | | | 219/69.11 |
| 2001/0014411 A1 | 8/2001 | Seong | |
| 2002/0093348 A1 * | 7/2002 | Buhler | B23K 20/007 |
| | | | 324/696 |
| 2003/0132200 A1 * | 7/2003 | Nakashima | B23H 1/022 |
| | | | 219/69.12 |
| 2008/0252474 A1 * | 10/2008 | Nakamura | H03K 17/955 |
| | | | 340/657 |
| 2009/0143891 A1 * | 6/2009 | Lin | B23H 7/26 |
| | | | 700/110 |
| 2012/0228268 A1 * | 9/2012 | Morita | B23H 1/022 |
| | | | 219/69.11 |
| 2014/0103014 A1 * | 4/2014 | Arakawa | B23H 1/022 |
| | | | 219/69.12 |
| 2015/0160147 A1 * | 6/2015 | De Paepe | G01N 33/0004 |
| | | | 165/276 |
| 2017/0266744 A1 * | 9/2017 | Sekimoto | B23H 7/02 |

* cited by examiner

PROCESS AND DEVICE FOR PREVENTING BREAKAGE OF ELECTRODE WIRE DURING MACHINING BY SPARK EROSION

TECHNICAL FIELD OF THE INVENTION

The present invention relates to wire EDM (electrical discharge machining) processes in which an electrode wire is used to cut an electrically conductive material by erosion using sparks in a dielectric medium between the electrode wire and the material, in an EDM machine.

The well-known EDM process allows material to be removed from a part made of electrically conductive material, by generating sparks in a sparking zone between the part to be machined and an electrically conductive electrode wire. The electrode wire, which is held by guides, is run off continuously in the vicinity of the part in the direction of the length of the wire, and it is gradually moved in the transverse direction toward the part either by transverse translation of the guides of the wire or by translation of the part.

In EDM machines, the sparking zone between the electrode wire and the part to be machined is submerged in a suitable dielectric fluid. An electrical power source is connected between the part to be machined and the electrode wire by electrical contacts located away from the sparking zone. The electrical power source allows, via the transmission of suitable electrical pulses, sparks to be generated that gradually erode the part and the electrode wire. Particles detached from the electrode wire and from the part by the sparks disperse in the dielectric fluid, from which they are removed. The longitudinal run-off of the electrode wire makes it possible to permanently keep a wire diameter that is normally sufficient to withstand, without breakage, the mechanical tension that is applied thereto in the sparking zone. The relative movement of the wire and of the part in the transverse direction allows the part to be cut or, where appropriate, its surface to be treated.

In EDM machines, electronic controlling means control the constituent units of the machine in order to establish or vary the machining parameters that the user chooses depending on the nature of the electrode wire, on the nature and dimensions of the part to be machined, and on particularities of the sought-after machining. The machining parameters generally comprise the frequency of the electrical pulses, the duration of the pause time between two successive electrical pulses, the initiation voltage, the energy of the spark current, the peak amplitude of the spark current, the duration of the spark current, the characteristics of the stream of dielectric liquid, the speed of longitudinal run-off of the electrode wire, and the speed of relative movement of the part to be machined with respect to the electrode wire.

To obtain precise machining, and in particular to produce small-radius cuts, it is necessary to use wires of small diameter that have a high ultimate mechanical strength permitting them to be held taut in the sparking zone and the amplitude of vibrations to be limited.

Most modern EDM machines are designed to use metal wires, generally of 0.25 mm diameter, and of ultimate strength comprised between 400 and 1000 N/mm$^2$.

Since EDM is a relatively slow process, there is simultaneously a need to maximize machining speed, in particular rough machining speed.

It is currently accepted that this machining speed depends directly on the sparking energy released in the sparking zone between the electrode wire and the part to be machined, and therefore depends on the electrical energy that the wire is able to conduct to the sparking zone. However, the erosive discharges in the sparking zone and the Joule heating produced by the electrical current flowing through the wire tend to heat the wire and simultaneously decrease its ultimate mechanical strength.

One of the limits of wires for EDM is thus that they break under the combined effect of heating and of the mechanical tension. This requires users to limit the machining power of their EDM machines, and this simultaneously limits machining speed.

A recurrent problem in wire EDM processes is thus the untimely breakage of the electrode wire. Since it is an effect that is apparently impossible to completely eliminate, provision has been made, in EDM machines, for means allowing the electrode wire to be automatically rethreaded after breakage thereof. However, after the breakage of the electrode wire, during the time required to rethread it, the machining process is necessarily interrupted, this substantially decreasing the overall speed at which the part is machined.

Various ways of attempting to decrease the frequency of untimely breakage of electrode wires during EDM processes have already been sought.

For example, the mechanical strength of the electrode wire has been increased via suitable choice of a constituent metal of high mechanical strength such as steel.

According to another example, it has been proposed to use EDM wires comprising a metal core and a continuous zinc coating, the effect of the coating being to limit heating of the metal core by virtue of the thermal energy consumed by the zinc during the vaporization thereof. It has been attempted to decrease the effect of the inevitable heating of the electrode wire by the machining sparks and Joule heating, with the hope thus of preventing this heating from causing breakages by decreasing the mechanical strength of the electrode wire.

According to another example, document CH 633 739 A5 describes an EDM wire and its manufacturing process, the wire having a core that is able to be made of copper or of a copper-zinc alloy, and that has a coating made of a different copper-zinc alloy and covered with a film made of zinc oxide. The document mentions that the coating made of copper-zinc alloy has a porous structure, and that the wire has a rough surface that increases the area of contact with the water that serves as dielectric machining liquid, this increasing the cooling of the wire and allowing a higher current to be passed.

The document EP 0 930 131 B1 also describes an EDM wire and its manufacturing process, the wire comprising a core made of a first copper-containing metal, an alloy layer formed on the core, and a surface layer formed on the alloy layer and made of a second metal having a lower vaporization temperature than that of the first metal. This document teaches that it is advantageous to obtain, on the surface of the wire, a porous layer containing open pores that increase the area of contact between the wire and the machining dielectric liquid, in order to better cool the wire.

According to another example, an electrode wire of high electrical conductivity is used to decrease the heating of the wire caused by the electrical current that flows through it, in the hope thus of preventing this inevitable heating from causing breakages by decreasing the mechanical strength of the electrode wire.

According to another example, the average electrical current that flows through the electrode wire is limited, so as to limit the inevitable heating of the electrode wire by the electrical current that flows through it.

According to another example, it has been attempted to decrease the frequency of the rapid spark initiations or short-circuits that inevitably occur randomly in the sparking zone between the electrode wire and the part to be machined, by promoting the removal of machining debris liable to be the cause of initiation of breakdown of the dielectric medium, in the hope that less frequent short-circuits will decrease the risk of breakage of the electrode wire. For example, in document U.S. Pat. No. 5,945,010, it is proposed to anneal zinc-coated a-phase brass so as to produce a peripheral layer made of y-phase brass, then to draw the intermediate product thus obtained in order to achieve the final diameter. The drawing produces a fractured y-phase brass surface layer. The surface of the EDM wire that results is irregular, and the document teaches that this promotes the removal of machining debris.

Document FR 2 527 960 A1 teaches that one of the causes of breakage of an electrode wire may be at least partially attributed to the presence of air bubbles that are conveyed by the electrode wire itself into the sparking zone, when the wire penetrates into the machining liquid. The described solution is then to decrease the quantity of air bubbles entrained by the electrode wire, by mechanically cleaning the wire before it enters into the sparking zone.

Unfortunately, despite these many attempts, which have been developed over many years, none of these known methods has, for the moment, achieved a satisfactory result, because random breakages of the electrode wire are still too frequently observed during EDM processes. Furthermore, limitation of the average electrical current that flows through the electrode wire, or use of steel-core electrode wires, cause an inevitable decrease in EDM speed, this in practice greatly decreasing the advantage of these methods.

SUMMARY OF THE INVENTION

There is therefore still a great interest in decreasing the frequency of random breakages of electrode wires during EDM processes, but if possible without decreasing machining speed.

One problem addressed by the present invention is thus that of effectively preventing the breakage of an electrode wire during EDM, without however causing a substantial decrease in the overall machining speed.

The present invention results from the following observation.

The inventors have observed that, during an EDM process, gas bubbles form in the sparking zone itself, in the interior of the dielectric liquid. These gas bubbles may be collected above the sparking zone. Most of the time, under conventional machining conditions, these gas bubbles are gradually removed from the sparking zone, in particular by escape upward or in the stream of dielectric liquid that removes machining debris.

Cleaning the electrode wire before it penetrates into the dielectric liquid, as taut in document FR 2 527 960 A1, does not prevent the formation of gas bubbles in the sparking zone itself, and it is probable that this is the reason why the solution proposed in this document does not sufficiently decrease the risk of breakage of the electrode wire.

Based on these observations, the idea behind the present invention is that the random breakages of the electrode wire are essentially due to the formation of gas bubbles in the sparking zone when, under certain machining conditions, said bubbles form in too great a quantity and agglomerate on the surface of the electrode wire around at least one segment of its useful length in the sparking zone: gas bubbles on the surface of the electrode wire, when they have agglomerated in too great a quantity over a certain length of the electrode wire, are liable to cause intense localized heating of the wire and breakage thereof.

One explanation seems to be that the agglomerated gas bubbles thermally insulate the electrode wire from the dielectric liquid and thus prevent it from being cooled locally. Another explanation seems to be that the agglomerated bubbles promote the initiation of sparks in the zone occupied by the bubbles, and thus increase localized heating of the electrode wire. These two effects may combine.

Thus, to avoid breakage of the electrode wire during EDM, without however causing a substantial decrease in overall machining speed, the present invention proposes a process for machining a part by electrical discharge machining using an electrode wire, wherein:

the electrode wire is tautened and driven to translate longitudinally in proximity to said part to be machined, in a sparking zone through which a stream of dielectric liquid is moved, using an electrical power source connected between the part to be machined and the electrode wire, electrical pulses are generated that cause sparks in the sparking zone between the electrode wire and the part to be machined, the quantity of gas bubbles present in the sparking zone between the electrode wire and the part to be machined is evaluated, at least one of the machining parameters is modified, depending on said evaluated quantity of gas bubbles, so as to maintain or return said evaluated quantity of bubbles to a suitable range of values.

The machining parameters mentioned above in the description of the solution are selected from the conventional machining parameters of EDM machines such as listed at the start of the present description in relation to the prior art.

It has been observed that the fact of keeping the quantity of gas bubbles below a tolerance threshold allows the risk of breakage of the electrode wire during EDM to be very substantially decreased.

According to a first embodiment, the machining parameter that is acted upon to decrease the risk of breakage of the electrode wire is the peak amplitude of the spark current. In this case, the peak amplitude of the spark current is decreased when said evaluated quantity of gas bubbles increases, and the peak amplitude of the spark current is increased after a preset dwell time or, preferably, when said evaluated quantity of gas bubbles decreases.

In this first embodiment, the peak amplitude of the spark current may advantageously be decreased when said evaluated quantity of gas bubbles has increased beyond an upper threshold, and, preferably, the peak amplitude of the spark current may be again increased when said evaluated quantity of gas bubbles has decreased below a lower threshold.

In practice, in a simpler version of such a first embodiment:

said evaluated quantity of gas bubbles is compared with at least one preset threshold quantity, when said evaluated quantity of gas bubbles reaches or exceeds said at least one preset threshold quantity, the peak amplitude of the spark current is decreased for a preset dwell time.

According to a second embodiment, the machining parameter that is acted upon to decrease the risk of breakage of the electrode wire is the pause time between said successive electrical pulses. In this case, the pause time between said successive electrical pulses is increased when said evaluated quantity of gas bubbles increases, and the pause time between said successive electrical pulses is decreased after a preset dwell time or, preferably, when said evaluated quantity of gas bubbles decreases.

In this second embodiment, the pause time between said successive electrical pulses may advantageously be increased when said evaluated quantity of gas bubbles has increased beyond an upper threshold, and, preferably, the pause time between said successive electrical pulses may be again decreased when said evaluated quantity of gas bubbles has decreased below a lower threshold.

In practice, in a simpler second embodiment:
said evaluated quantity of gas bubbles is compared with at least one preset threshold quantity,
when said evaluated quantity of gas bubbles reaches or exceeds said at least one preset threshold quantity, the pause time between said successive electrical pulses is increased for a preset dwell time.

In either one of these embodiments, the quantity of gas bubbles present in the sparking zone between the electrode wire and the part to be machined may advantageously be evaluated indirectly by measuring the electrical impedance between the electrode wire and the part to be machined during the time interval between two successive pulses of spark current.

In practice, the value of the capacitive element of the electrical impedance between the electrode wire and the part to be machined is measured during the time interval between two successive pulses of spark current. Thus, perturbation of the erosive sparks is avoided and thus machining effectiveness is maintained.

According to a first possibility, the value of the capacitive element of the electrical impedance between the electrode wire and the part to be machined is deduced from a measurement of the rise speed of the voltage between the electrode wire and the part to be machined during the application of an initiation electrical-voltage pulse before the latter causes a spark.

According to a second possibility, the quantity of gas bubbles present in the sparking zone between the electrode wire and the part to be machined is indirectly evaluated by injecting, between the electrode wire and the part to be machined, a high-frequency electrical current during the pause time between two successive electrical pulses, and by measuring the impedance of the electrical circuit at this high frequency in order to deduce therefrom the value of the capacitive element of the electrical impedance between the electrode wire and the part to be machined.

With the same aim and according to another aspect, the present invention proposes a device for machining a part by electrical discharge machining using an electrode wire, comprising:
means for holding the electrode wire taut and driving it to translate longitudinally in proximity to said part to be machined, in a sparking zone,
means for making a stream of dielectric liquid flow through the sparking zone between the electrode wire and the part to be machined,
an electrical power source connected between the part to be machined and the electrode wire, and able to generate electrical pulses able to cause sparks in the sparking zone between the electrode wire and the part to be machined,
controlling means that control said electrical power source, the means for making the stream of dielectric liquid flow, and other means for establishing or changing machining parameters by setting the characteristics of said electrical pulses, the characteristics of the stream of dielectric liquid, and the other machining parameters,
measuring means for evaluating the quantity of gas bubbles present in the sparking zone between the electrode wire and the part to be machined, and for delivering to the controlling means a signal representative of said evaluated quantity of gas bubbles,
in the controlling means, adapting means for modifying at least one of the machining parameters, depending on said signal representative of said evaluated quantity of gas bubbles present in the sparking zone between the electrode wire and the part to be machined, so as to maintain or return the value of said signal to a suitable range of signal values.

According to a first embodiment, said adapting means may comprise:
a comparator for comparing, to at least one preset signal threshold, said signal representative of the quantity of gas bubbles present in the sparking zone between the electrode wire and the part to be machined,
a recorded control program for controlling the electrical power source so as to decrease the peak amplitude of the spark current when said signal representative of said quantity of gas bubbles present in the sparking zone reaches or exceeds said at least one signal threshold.

According to a second embodiment, said adapting means may comprise:
a comparator for comparing, to at least one preset signal threshold, said signal representative of said quantity of gas bubbles present in the sparking zone between the electrode wire and the part to be machined,
a recorded control program for controlling the electrical power source so as to increase the pause time between said successive electrical pulses when said signal representative of said quantity of gas bubbles present in the sparking zone reaches or exceeds said at least one signal threshold.

The means for evaluating the quantity of gas bubbles present in the sparking zone between the electrode wire and the part to be machined may advantageously comprise means for measuring the capacitive component of the impedance of the electrical circuit formed by the sparking zone between the electrode wire and the part to be machined.

According to a first possibility, said means for measuring the capacitive impedance component take a measurement of the rise speed of the initiation voltage between the electrode wire and the part to be machined.

According to a second possibility, said means for measuring the capacitive impedance component comprise:
a high-frequency generator able to inject, between the electrode wire and the part to be machined, a high-frequency electrical current,
means for measuring the complex impedance of the electrical circuit into which said high-frequency generator injects said high-frequency electrical current,
computing means for extracting, from said measured complex impedance, the value of the capacitive impedance component of the electrical circuit formed by the sparking zone between the electrode wire and the part to be machined.

BRIEF DESCRIPTION OF THE DRAWINGS

Other objects, features and advantages of the present invention will become apparent from the following description of particular embodiments, which description is given with reference to the appended figures, in which.

DESCRIPTION OF PREFERRED EMBODIMENTS

FIGS. 1 to 6 will firstly be considered, these figures illustrating the process and device according to the present invention, which allow machining to be carried out by spark erosion by means of an electrode wire 4, while decreasing the risk of untimely breakage of the electrode wire 4 without substantially decreasing the speed at which a part to be machined 8 is electrically discharge machined.

Figure 1:
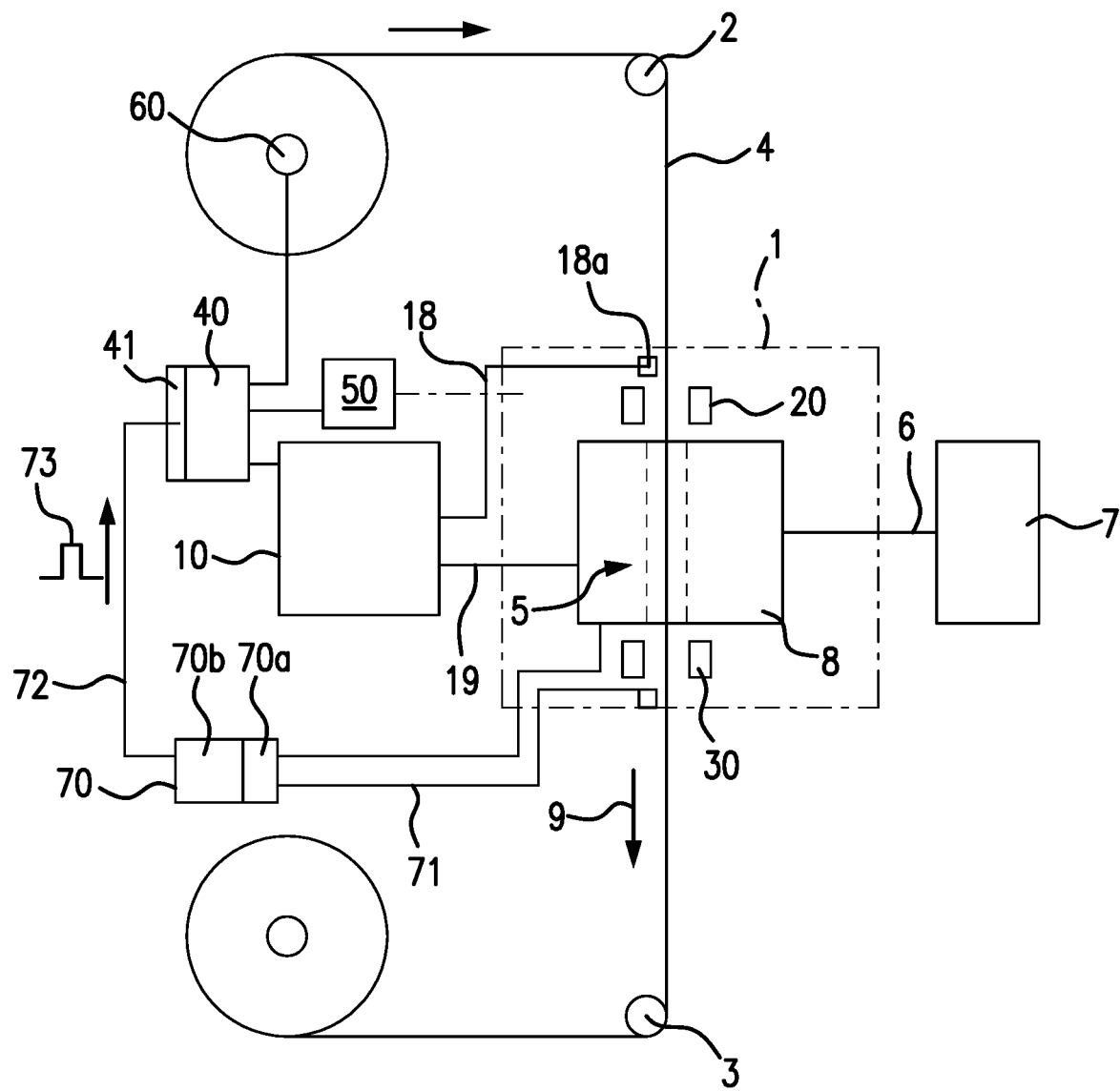
FIG. 1 is a schematic view of a wire-electrode EDM machine incorporating a device according to the present invention.

The EDM machine, such as illustrated in FIG. 1, essentially comprises a machining chamber 1 containing a stream of a dielectric such as deionized water, means such as pulleys 2 and 3 and wire guides 20 and 30 for holding an electrode wire 4 and keeping it taut in a sparking zone 5 in the interior of the chamber 1, a part holder 6 and means 7 for moving the part holder 6 with respect to the electrode wire 4 in the sparking zone 5. The part 8 to be machined, held by the part holder 6, is placed in the sparking zone 5. The wire guides 20, 30 are located on either side of the part 8 to be machined, and guide the electrode wire 4 with precision. To do so, they are positioned close to the part 8 to be machined, and their diameter is slightly larger than that of the electrode wire 4, for example a diameter of 254 μm for an electrode wire 4 of 250 μm. The electrode wire 4 runs off longitudinally as indicated by the arrow 9 in the sparking zone 5 facing the part 8 to be machined. An electrical power source 10, electrically connected on the one hand to the electrode wire 4 via a line 18 and at least one contact 18a that touches the electrode wire 4 during its passage through the dielectric of the chamber 1 between the pulley 2 and the wire guide 20, and on the other hand to the part to be machined 8 via a line 19, generates in the sparking zone 5 an electrical energy that is suitable for making sparks or electric arcs appear between the part 8 to be machined and the electrode wire 4.

Figure 7:
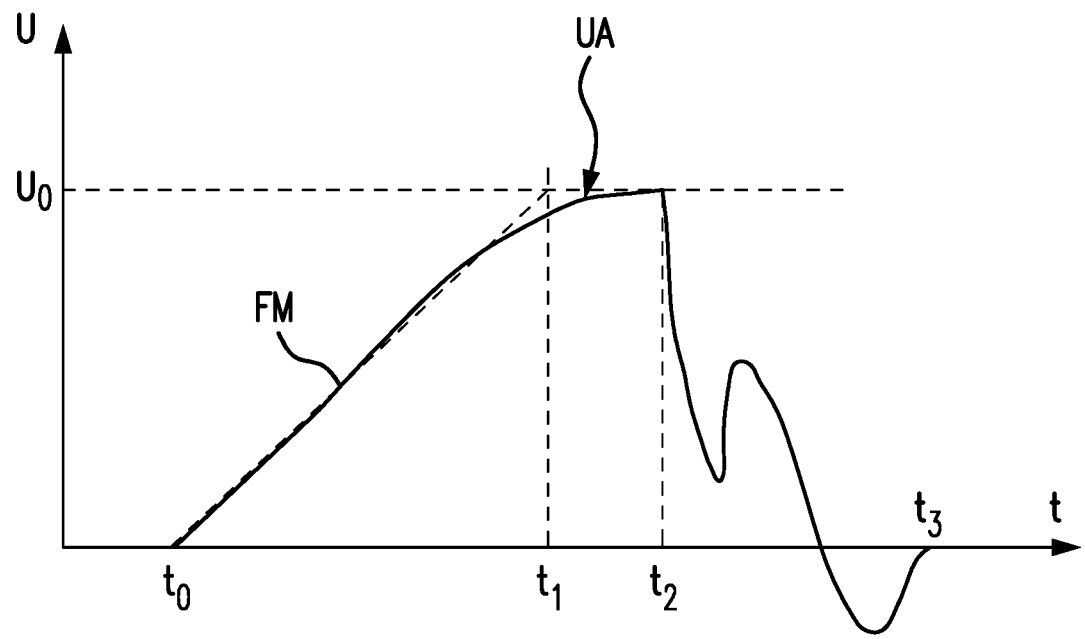
FIG. 7 is a schematic view illustrating the waveform of the voltage between the electrode wire and the part to be machined during an erosive sparking step.
Figure 8:
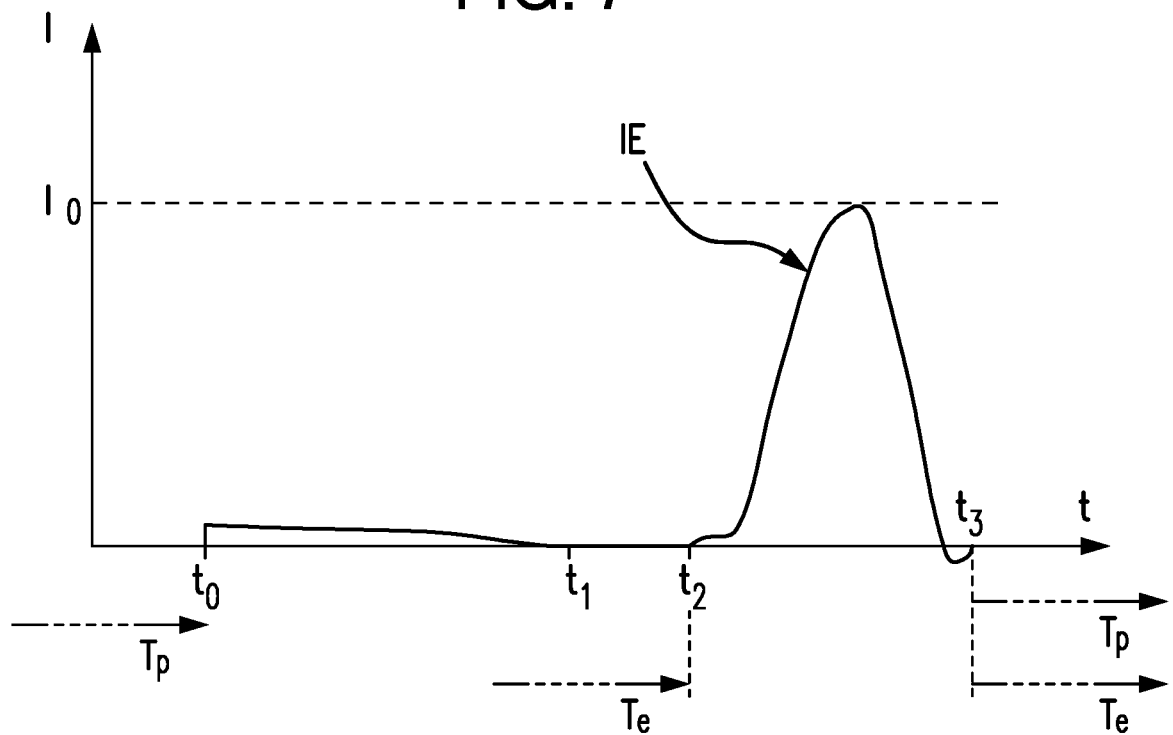
FIG. 8 is a schematic view illustrating the waveform of the electrical current flowing through the electrode wire, the dielectric and the part to be machined during an erosive sparking step.

FIGS. 7 and 8 will now be considered, these figures respectively illustrating, as a function of time t, the waveform of the voltage U and the waveform of the current I during an EDM electrical pulse. The electrical pulse firstly comprises, between the times $t_0$ and $t_2$, an initiation voltage pulse UA, then, between the times $t_2$ and $t_3$, a spark current pulse IE.

In FIG. 7, the electrical power source 10 generates an initiation voltage pulse UA the rising front FM of which extends from the initial time $t_0$ to the establishment end time $t_1$. The establishment of the maximum initiation voltage $U_0$ between the electrode wire 4 and the part 8 to be machined in the sparking zone 5 is not instantaneous, but occurs via an exponential rising front FM because it is a question of the establishment of a voltage across the terminals of an electrical circuit formed by the sparking zone 5 essentially having the properties of an electrical capacitor: in the absence of sparks, the dielectric liquid present in the sparking zone 5 insulates the metal elements that are the electrode wire 4 and the part 8 to be machined, and they together form a capacitive element.

After the time $t_1$ and up to a time $t_2$ the electrical power source 10 maintains the voltage $U_0$ while waiting for the dielectric to break down.

At the time $t_2$ the breakdown of the dielectric occurs, and the voltage U between the electrode wire 4 and the part 8 to be machined drops abruptly, and remains low up to the time $t_3$.

In FIG. 8, which illustrates the waveform of the electrical current I supplied by the electrical power source 10, the electrical current I remains low between the times $t_0$ and $t_1$, and it remains almost zero between the times $t_1$ and $t_2$. After the time $t_2$ at which breakdown occurs, the electrical power source 10 generates the spark current IE in the form of a current pulse having a peak magnitude or amplitude $I_0$ and that ends at the time $t_3$. It is this current pulse, or spark current IE, that feeds and sustains the EDM spark.

After the time $t_3$, the electrical power source 10 waits a pause time Tp, and the cycle restarts with a new voltage pulse.

It will be understood that an erosive spark is produced on each pulse of spark current IE. FIG. 8 illustrates the time interval Te between two successive sparks, i.e. between two successive pulses of spark current IE.

The electrical power source 10 may act on the machining power, in particular by modulating the peak magnitude or amplitude $I_0$ of the spark current IE, the pulse duration of the spark current IE between the times $t_2$ and $t_3$, and the pause time Tp between two successive electrical pulses UA-IE.

Consider once again FIG. 1. The EDM machine comprises controlling means 40 for controlling the various units of the EDM machine depending on suitable machining parameters. The user may choose certain machining parameters in particular depending on the nature and shape of the part to be machined 8, the makeup of the electrode wire 4, and on the type of machining (rough machining, finishing) to be carried out.

Thus, the controlling means 40 control the electrical power source 10 in particular by adapting the value, the waveform and the other parameters of the electrical energy generated in the sparking zone 5 by the electrical power source 10.

The controlling means 40 also control the other units of the EDM machine, in particular the means 50 for making the stream of dielectric liquid flow through the sparking zone 5, the driving means 60 such as an electric motor for driving the electrode wire 4 to translate longitudinally, as illustrated by the arrow 9, and for adapting its run-off speed in the sparking zone 5, and moving means 7 that ensure the movement of the part 8 to be machined with respect to the electrode wire 4 depending on the desired machining steps.

In the illustrated embodiment, the EDM machine furthermore comprises measuring means 70, the input-output lines 71 of which are electrically connected to the part 8 to be machined and to the electrode wire 4, respectively, and that are able to evaluate the quantity of gas bubbles present in the sparking zone 5 between the electrode wire 4 and the part 8 to be machined. The measuring means 70 deliver, to the controlling means 40, via the transmission line 72, a signal 73 representative of said evaluated quantity of gas bubbles.

According to a first embodiment, the measuring means 70 may comprise a high-frequency generator 70a able to inject via the input-output lines 71 a high-frequency electrical current between the electrode wire 4 and the part 8 to be machined, and measuring means 70b for measuring the capacitive element of the complex electrical impedance of the electrical circuit across the terminals of the input-output lines 71 at this high frequency and for deducing therefrom the signal 73 representative of the evaluated quantity of gas bubbles.

In practice, any circuit forming a capacitance meter capable of rapidly measuring capacitances of about 5 to 100 pF in a measurement time shorter than the conventional pause time Tp (about 0.5 ms) between two successive electrical pulses will possibly be used. During this pause time Tp, the output impedance of the electrical power source 10 must be very high, of open-circuit type, in order not to perturb the capacitance measurement.

Alternatively, according to a second embodiment, the measuring means 70 may receive, via the input-output lines 71, the waveform of the voltage present between the electrode wire 4 and the part 8 to be machined during the initiation voltage pulse UA, and may deduce therefrom, by measuring the rise speed of the initiation voltage U between the electrode wire 4 and the part 8 to be machined during the application of an initiation voltage pulse UA by the electrical power source 10, the value of the capacitive element of the electrical impedance present between the electrode wire 4 and the part 8 to be machined, in order to deduce therefrom the signal 73 representative of the evaluated quantity of gas bubbles.

In the controlling means 40, adapting means 41 are programmed to modify the machining parameters depending on the signal 73 representative of said evaluated quantity of gas bubbles, so as to maintain or return the value of said signal 73 to a suitable range of signal values.

The limits of the suitable range of signal values in particular depend on the nature and shape of the part 8 to be machined, on the makeup of the electrode wire 4, and on the type of machining to be carried out. These limits must therefore be determined by the user, via routine machining trials during which a satisfactory machining speed and a substantial decrease in the frequency of potential electrode-wire breakages will be observed.

In practice, a range of signal values defined solely by an upper limit will possibly be chosen, the adapting means 41 then being programmed to decrease the sparking energy during a preset waiting time allowing a sufficient removal of the gas bubbles, and to then return the sparking energy to its prior level at the end of the preset waiting time.

However, a range of signal values defined by an upper limit and a lower limit will allow the EDM speed to be optimized.

The controlling means 40 and the adapting means 41 may take the form of a microprocessor or a microcontroller associated with a suitable program. In practice, the conventional control units of EDM machines may themselves be programmed to perform the functions described above and to accordingly control the constituent units of the EDM machine according to the process of the present invention.

Figure 2:
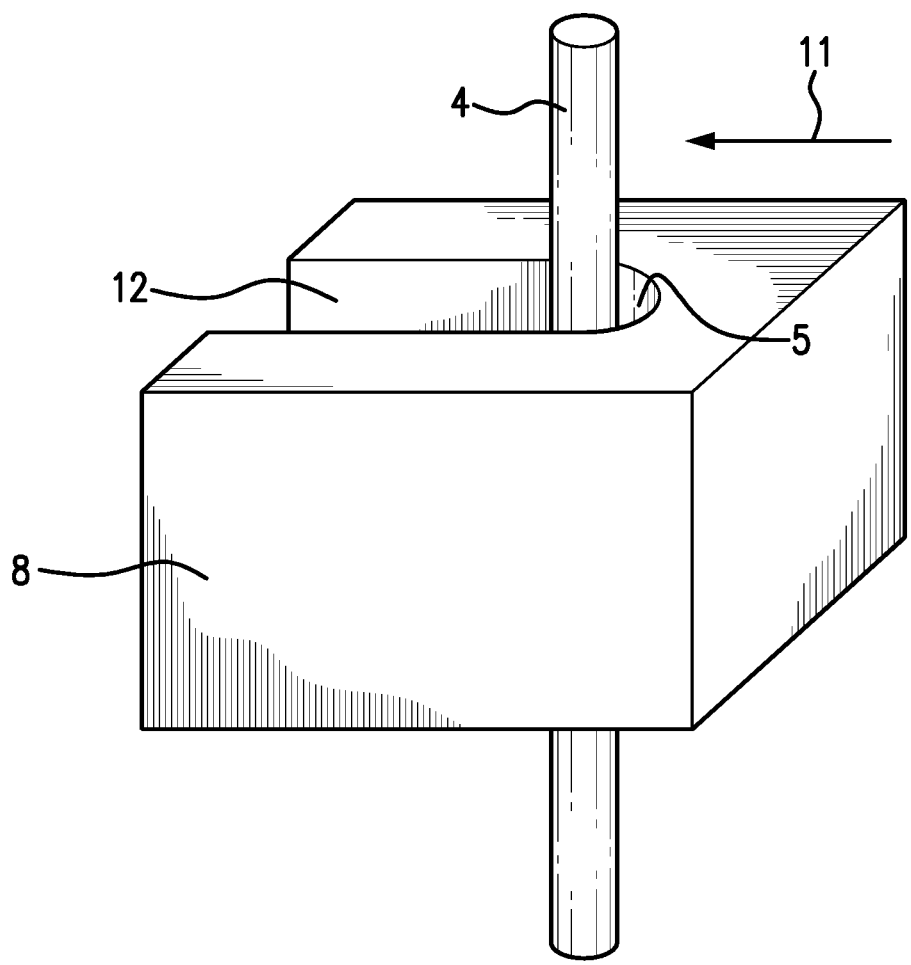
FIG. 2 is a schematic perspective view illustrating, at larger scale, a part to be machined during machining with the electrode wire.

As may be seen in FIG. 2, by moving the part to be machined in a transverse direction, as indicated by the arrow 11, spark erosion gradually causes the electrode wire 4 to penetrate into the bulk of the part 8 to be machined, which is electrically conductive, and produces a slot 12. In the illustrated example, the cut is a rectilinear slot 12, which occupies the entire height H of the part 8 to be machined. Via a non-linear movement 11 of the part 8 to be machined, the cut may be non-linear.

The movement of the part 8 to be machined must follow the erosion produced by the sparks, without excess. Too slow a speed decreases the machining speed. Too high a speed leads to contact of the electrode wire 4 and the part 8 to be machined, and stoppage of the machine as a result of this short-circuit.

Figure 3:
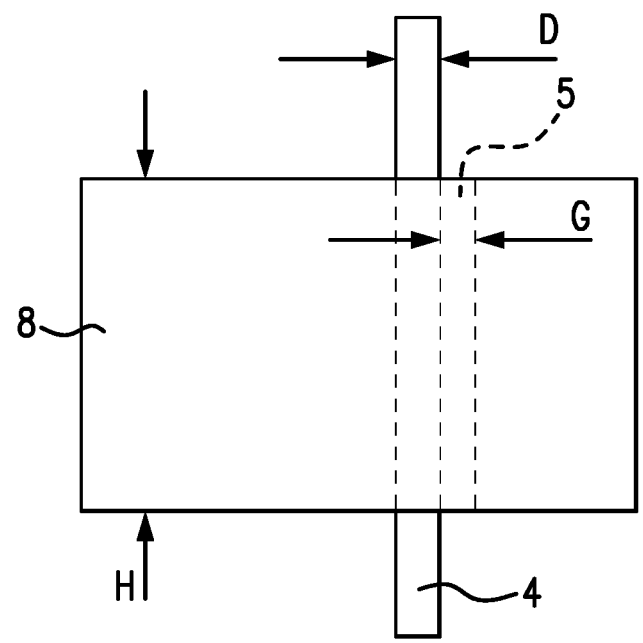
FIG. 3 is a schematic face-on view of the ensemble of FIG. 2.
Figure 4:
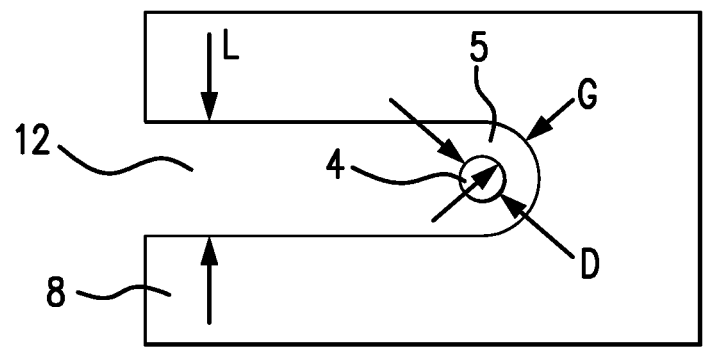
FIG. 4 is a schematic top view of the ensemble of FIG. 2.

FIGS. 3 and 4 illustrate in more detail the sparking zone 5 in the slot 12. By adapting the speed of movement of the part 8 to be machined, the spacing G between the exterior surface of the electrode wire 4 and the interior surface of the slot 12 is kept substantially constant. Thus, the sparking zone 5 is located between the semi-cylindrical back of the slot 12 and the semi-cylinder formed by the half-surface of the electrode wire 4 that is oriented toward the semi-cylindrical back of the slot 12. The width L of the slot 12 is equal to the diameter D of the electrode wire increased by two times the spacing G.

Figure 5:
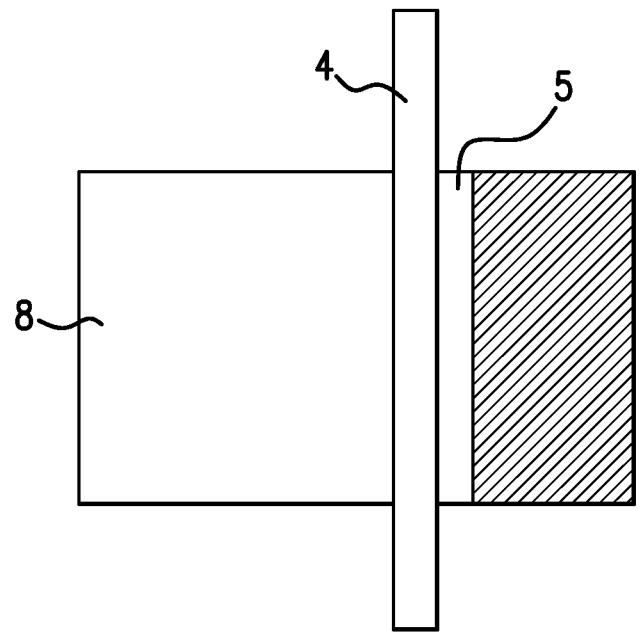
FIG. 5 is a schematic face-on view in cross section illustrating the sparking zone without the presence of gas bubbles.
Figure 6:
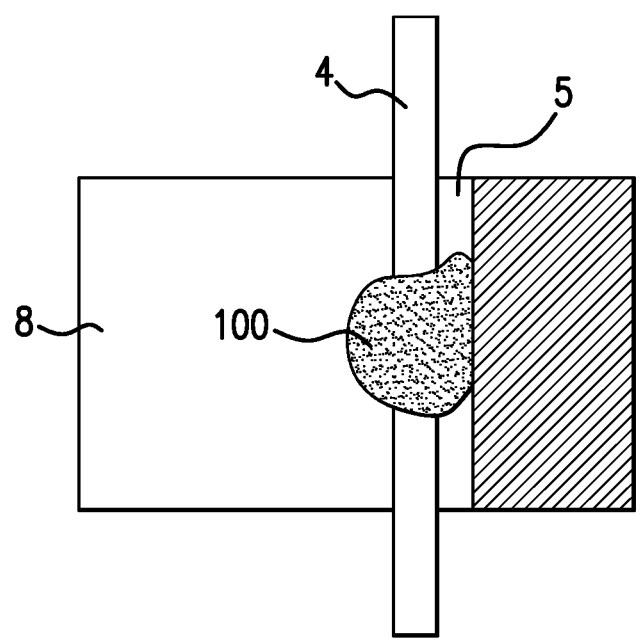
FIG. 6 is a schematic face-on view in cross section illustrating the sparking zone in the presence of a gas bubble.

FIGS. 5 and 6 illustrate, in cross section along the median plane of the slot 12, the sparking zone 5 between the electrode wire 4 and the part 8 to be machined. In FIG. 5, the sparking zone 5 is illustrated in a "normal" state in which no gas bubble has amassed about the electrode wire 4. In contrast, in FIG. 6, the sparking zone 5 is illustrated in a "risk of breakage" state in which a gas bubble 100 has amassed around the electrode wire 4. It will be understood that, in the segment of length occupied by the gas bubble 100, the electrode wire 4 is thermally insulated from the dielectric liquid filling the rest of the sparking zone 5. As a result, the temperature of said segment of length of electrode wire rapidly increases and causes an increase in the risk of breakage of the electrode wire 4 in said segment of length occupied by the gas bubble 100.

The present invention, by detecting the presence of an abnormally high quantity of gas bubbles in the sparking zone 5, and by adapting accordingly and momentarily the machining parameters until this quantity of gas bubbles returns to an acceptable level, aims to prevent the appearance of such a gas bubble 100 of large volume and amassed on the electrode wire 4. A very noticeable decrease in the risk of breakage of the electrode wire 4 results.

A simulation has shown that, in the case of an electrode wire 4 the diameter D of which is 250 µm, of a part to be machined the height H of which is 0.1 m, and of a conventional spacing G of 40 µm, the value of the capacitive element of the electrical impedance present in the sparking zone 5 is about 800 pF when the dielectric liquid is deionized water, since the electrical permittivity of liquid water is about 81.

In contrast, the same simulation shows, assuming that a gas bubble 100 occupies all the sparking zone 5, that the value of the capacitive element of the electrical impedance present in the sparking zone 5 would be about 10 pF, since the electrical permittivity of the bubble gases is about 1.

It will be understood that the presence of gas bubbles occupying only some of the sparking zone 5 leads to an intermediate value of the capacitive element, which value will be comprised between 800 pF and 10 pF when the dielectric liquid used is deionized water.

It may therefore be seen that it is possible to evaluate the quantity of gas bubbles present in the sparking zone 5 by measuring the value of the capacitive electrical-impedance element present in the sparking zone 5. When this value decreases, this indicates an increase in the presence of gas bubbles, and therefore an increase in the risk of presence of insulating gas bubbles such as the gas bubble 100 illustrated in FIG. 6.

It will be noted that, when using this method for evaluating the quantity of gas bubbles, it is more advantageous to use deionized water than an oil-based dielectric, because an oil-based dielectric will have a permittivity close to 2.2, i.e. closer to that of the gases forming the gas bubbles, this decreasing the sensitivity of the detection by measurement of capacitance.

The capacitive element of the complex electrical impedance present between the electrode wire 4 and the part 8 to be machined must preferably be measured without perturbing the EDM process. In practice, in the first embodiment in which a high frequency is injected by the measuring means, the measuring step will have to be carried out during the pause time Tp. In the second embodiment in which the rise speed of the initiation voltage is measured, the measuring step will be carried out during the time interval between the times $t_0$ and $t_1$, i.e. during the rising front FM of the initiation voltage pulse, without modifying the value and waveform of this pulse.

The present invention is not limited to the embodiments that have been explicitly described, but includes the various variants and generalizations thereof encompassed by the scope of the following claims.

The invention claimed is:

1. An adaptive process for machining a part by electrical discharge using an electrode wire, the process comprising the steps of:
   tightening and driving said electrode wire to translate longitudinally in proximity to said part being machined, in a sparking zone through which a stream of dielectric liquid is moved,
   using an electrical power source connected between the part being machined, and the electrode wire, to generate electrical pulses which cause sparks in the sparking zone between the electrode wire and the part being machined,
   measuring a quantity of gas bubbles present in the sparking zone between the electrode wire and the part, the measuring step being performed while the machining process is being conducted,
   modifying at least one machining parameter, in response to measurement of said quantity of gas bubbles, so as to maintain or return the measured quantity of bubbles to a suitable range of values, the modifying step being performed adaptively while the machining process is being conducted,
   wherein the measuring step is performed indirectly by measuring an electrical impedance between the electrode wire and the part being machined during a time interval between two successive pulses of spark current.

2. The process of claim 1, wherein a peak amplitude of a spark current is decreased when said quantity of gas bubbles increases, and the peak amplitude of the spark current is increased when said quantity of gas bubbles decreases.

3. The process of claim 1, further comprising:
   comparing said quantity of gas bubbles with at least one preset threshold quantity,
   decreasing a peak amplitude of spark current for a preset time, when the quantity of gas bubbles reaches or exceeds said preset threshold quantity.

4. The process of claim 1, further comprising:
   increasing a pause time between successive electrical pulses when said quantity of gas bubbles increases, and
   decreasing the pause time between said successive electrical pulses when said quantity of gas bubbles decreases.

5. The process of claim 1, further comprising:
   comparing said quantity of gas bubbles with at least one preset threshold quantity, and
   increasing a pause time between successive electrical pulses, for a preset time, when said quantity of gas bubbles reaches or exceeds said preset threshold quantity.

6. The process of claim 1, wherein the measuring step includes measuring a value of a capacitive element of the electrical impedance between the electrode wire and the part being machined, during the time interval between two successive pulses of spark current.

7. The process of claim 6, wherein the value of the capacitive element of the electrical impedance between the electrode wire and the part being machined is deduced by measuring a rise speed of the voltage between the electrode wire and the part being machined, during an application of an initiation electrical-voltage pulse before the latter causes a spark.

8. The process of claim 1, wherein the measuring step is performed indirectly, by injecting, between the electrode wire and the part being machined, a high-frequency electrical current during a pause time between two successive electrical pulses, and by measuring an impedance, at this high frequency, of an electrical circuit formed by the sparking zone between the electrode wire and the part being machined, in order to deduce therefrom a value of a capacitive element of the electrical impedance between the electrode wire and the part being machined.

9. A device for machining a part by electrical discharge machining using an electrode wire, the device comprising:
   means for holding the electrode wire taut and for driving the electrode wire to translate longitudinally in proximity to said part being machined in a sparking zone,
   a stream of dielectric liquid flowing through the sparking zone between the electrode wire and the part being machined,
   an electrical power source electrically connected between the part being machined and the electrode wire, the power source being capable of generating electrical pulses sufficient to cause sparks in the sparking zone between the electrode wire and the part being machined,
   measuring means for evaluating a quantity of gas bubbles present in the sparking zone between the electrode wire and the part, while the part is being machined, and for delivering a signal to a controller, the signal being representative of said evaluated quantity of gas bubbles,
   wherein the controller includes adapting means for modifying at least one machining parameter, depending on a value of said signal, so as to maintain or return the value of said signal to a suitable range of signal values while the part is being machined,
   wherein the measuring means comprises means for measuring an electrical impedance between the electrode wire and the part being machined, during a time interval between two successive pulses of spark current.

10. The machining device of claim 9, wherein said adapting means comprise:
  a comparator for comparing, to at least one preset signal threshold, said signal representative of the quantity of gas bubbles present in the sparking zone between the electrode wire and the part being machined,
  a recorded control program for controlling the electrical power source so as to decrease a peak amplitude of a spark current when said signal representative of said quantity of gas bubbles present in the sparking zone reaches or exceeds said at least one signal threshold.

11. The machining device of claim 9, wherein said adapting means comprises:
  a comparator for comparing, to at least one preset signal threshold, said signal representative of said quantity of gas bubbles present in the sparking zone between the electrode wire and the part being machined,
  a recorded control program for controlling the electrical power source so as to increase a pause time between successive electrical pulses when said signal representative of said quantity of gas bubbles present in the sparking zone reaches or exceeds said at least one signal threshold.

12. The machining device of claim 9, wherein the measuring means comprises means for measuring a capacitive component of an impedance of an electrical circuit formed by the sparking zone between the electrode wire and the part being machined.

13. The machining device of claim 9, wherein said means for measuring a capacitive component takes a measurement of a rise speed of an initiation voltage between the electrode wire and the part being machined.

14. The machining device of claim 12, wherein said means for measuring a capacitive component comprises:
  a high-frequency generator able to inject, between the electrode wire and the part being machined, a high-frequency electrical current,
  means for measuring a complex impedance of an electrical circuit into which said high-frequency generator injects said high-frequency electrical current,
  a microprocessor or a microcontroller associated with a program for extracting, from said measured complex impedance, a value of a capacitive impedance component of an electrical circuit formed by the sparking zone between the electrode wire and the part being machined.

* * * * *